(12) United States Patent
Sung et al.

(10) Patent No.: US 7,738,894 B2
(45) Date of Patent: Jun. 15, 2010

(54) METHOD AND SYSTEM FOR PERFORMING MEDIA STORAGE SERVICE IN PUSH-TO-TALK OVER CELLULAR NETWORK

(75) Inventors: Sang-Kyung Sung, Seoul (KR); Hyeon-Cheol Pu, Suwon-si (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 645 days.

(21) Appl. No.: 11/402,107

(22) Filed: Apr. 11, 2006

(65) Prior Publication Data

US 2006/0229095 A1 Oct. 12, 2006

(30) Foreign Application Priority Data

Apr. 11, 2005 (KR) ............... 10-2005-0029945

(51) Int. Cl.
*H04B 7/00* (2006.01)
(52) U.S. Cl. .............. 455/518; 455/519; 455/3.06; 709/201
(58) Field of Classification Search .......... 455/518, 455/90.2, 413, 412.1, 416, 410, 519, 414.1, 455/517, 513, 556.2, 414.4, 3.06; 370/310, 370/352, 357, 355; 709/205, 203, 201
See application file for complete search history.

(56) References Cited

U.S. PATENT DOCUMENTS

2002/0173327 A1 11/2002 Rosen et al.
2004/0224710 A1* 11/2004 Koskelainen et al. ........ 455/518
2005/0124365 A1* 6/2005 Balasuriya et al. .......... 455/518
2006/0023649 A1* 2/2006 Tillet et al. .................. 370/310
2006/0025165 A1* 2/2006 Tillet et al. .................. 455/517
2006/0035630 A1* 2/2006 Morishima et al. .......... 455/416
2006/0046757 A1* 3/2006 Hoover et al. ............... 455/518
2006/0046758 A1* 3/2006 Emami-Nouri et al. ...... 455/518
2006/0087982 A1* 4/2006 Kuure et al. ................. 370/252
2006/0149811 A1* 7/2006 Bennett et al. .............. 709/203
2007/0127670 A1* 6/2007 Morishima et al. ..... 379/202.01
2007/0238478 A1* 10/2007 Sung ........................... 455/518
2008/0320083 A1* 12/2008 Albertsson et al. .......... 709/205

FOREIGN PATENT DOCUMENTS

| JP | 2002-536928 | 10/2002 |
|---|---|---|
| KR | 2005/0115686 | 12/2005 |
| RU | 2 154 357 | 8/2000 |
| RU | 2 273 114 | 3/2006 |
| WO | WO 00/47005 | 8/2000 |
| WO | WO 2005/101697 | 10/2005 |
| WO | WO 2005/101742 | 10/2005 |

* cited by examiner

*Primary Examiner*—Tan Trinh
(74) *Attorney, Agent, or Firm*—The Farrell Law Firm, LLP

(57) ABSTRACT

A method is disclosed which sets a PoC Box service and transmits information on a service identifier by using a standard SIP, a SDP, an XCAP, and a PAP, in order to remain compatible with conventional PoC technology when performing call processing of session connection using a PoC Box. Further, the method stores only pre-designated media in a PoC Box according to a type of media transmitted in consideration of features of a PoC multimedia session.

32 Claims, 9 Drawing Sheets

FIG. 5

PUBLISH sip:pfb_server@example.domain.com SIP/2.0
Via: SIP/2.0/UDP client_bpc.domain.com;branch=z9hG4bK776sgdkse
From: <sip:client_b@domain.com>;tag=49583
To: <sip:pfb_server@example.domain.com>
Call-ID: asd88asd77a@client_apc.domain.com
CSeq: 80 PUBLISH
Max-Forwards: 70
Accept-Contact: *;+g.poc.talkburst;require;explicit
Event: poc-settings
Content-Type: application/poc-settings+xml
Content-Length: <appropriate value>

<?xml version="1.0" encoding="UTF-8"?>
<poc-settings
    xmlns="urn:oma:params:xml:ns:poc:poc-settings"
    xmlns:xsi="http://www.w3.org/2001/XMLSchema-instance"
    xsi:schemaLocation="urn:oma:params:xml:ns:poc:poc-settings">

<note>PoC Box Configuration</note>
    <am-settings>
        <answer-mode>automatic</answer-mode>
    </am-settings>
    <pocbox-settings>
       <poc-box active="true">
       <media-video active="false">
       <media-audio active="true">
       <media-text active="false">
    </pocbox-settings>
</poc-settings>

FIG. 6A

```xml
<?xml version="1.0" encoding="UTF-8"?>
<xs:schema targetNamespace="urn:oma:params:xml:ns:poc:poc-settings"
    xmlns="urn:oma:params:xml:ns:poc:poc-settings"
    xmlns:xs="http://www.example.com/2001/XMLSchema"
    elementFormDefault="qualified"
    attributeFormDefault="unqualified">

<xs:import namespace="http://www.example.com/XML/1998/namespace"
    schemaLocation="http://www.example.com/2001/xml.xsd"/>
<xs:annotation>
  <xs:documentation xml:lang="en">
    XML Schema Definition in support of ... and PoC Box in the Push-to-talk over Cellular (PoC) service.
  </xs:documentation>
</xs:annotation>

<xs:element name="poc-settings" type="poc-settingsType"/>
<xs:complexType name="poc-settingsType">
  <xs:sequence>
    <xs:element name="pocbox-settings" type="pocboxSettingType"
        minOccurs="0" maxOccurs="unbounded"/>
    <xs:any namespace="##other" processContents="lax"
        minOccurs="0" maxOccurs="unbounded"/>
  </xs:sequence>
  <xs:anyAttribute namespace="##other"/>
</xs:complexType>
```

```xml
<xs:complexType name="pocboxSettingType">
    <xs:sequence>
      <xs:element name="poc-box">
        <xs:complexType>
          <xs:attribute name="active" type="xs:boolean"
                  user="required" />
        </xs:complexType>
      </xs:element>
      <xs:element name="media-video">
        <xs:complexType>
          <xs:attribute name="active" type="xs:boolean"
                  user="required" />
        </xs:complexType>
      </xs:element>
      <xs:element name="media-audio">
        <xs:complexType>
          <xs:attribute name="active" type="xs:boolean"
                  user="required" />
        </xs:complexType>
      </xs:element>
      <xs:element name="media-text">
        <xs:complexType>
          <xs:attribute name="active" type="xs:boolean"
                  user="required" />
        </xs:complexType>
      </xs:element>
      <xs:element name="media-data">
        <xs:complexType>
          <xs:attribute name="active" type="xs:boolean"
                  user="required" />
        </xs:complexType>
      </xs:element>
      <xs:any namespace="##other" processContents="lax"
            minOccurs="0" maxOccurs="unbounded"/>
    </xs:sequence>
    <xs:anyAttribute namespace="##other"/>
  </xs:complexType>
</xs:schema>
```

FIG. 7

SIP 200 OK
Via: SIP/2.0/UDP cf_x.poc.domain.com;branch=z9hG4bK776sgdkse
From: Conference_X <sip:conf_server_x@domain.com>;tag=49583
To: Client_B <sip:client_b@domain.samsung.com>;tag=382751
Call-ID: d432fa84b4c76e66710
CSeq: 29887 INVITE
Allow: INVITE, ACK, CANCEL, OPTIONS, BYE, REFER, NOTIFY
Contact:<sip:pf_b@domain.samsung.com>;+g.poc.talkburst
Content-Type: application/sdp
Content-Length: <appropriate value> v=0
o=27 29 IN IP6 5555::aaa:bbb:ccc:ddd
c=IN IP6 5555::aaa:bbb:ccc:ddd
m=audio 3456 RTP/AVP 97
a=rtpmap:97 AMR
a=rtcp:5560
m=application 2000 udp TBCP
a=fmtp:TBCP queuing=0; tb_priority=0; poc_box=1

--------Boundary1
<XML MIME Body>
-
</XML MIME Body>

METHOD AND SYSTEM FOR PERFORMING MEDIA STORAGE SERVICE IN PUSH-TO-TALK OVER CELLULAR NETWORK

CLAIM OF PRIORITY

This application claims the benefit under 35 U.S.C. §119(a) from an application entitled "METHOD AND SYSTEM FOR PERFORMING MEDIA STORAGE SERVICE IN PUSH-TO-TALK OVER CELLULAR NETWORK" filed in the Korean Intellectual Property Office on Apr. 11, 2005 and assigned Serial No. 2005-29945, the contents of which are incorporated herein by reference.

BACKGROUND OF THE INVENTION

1. Field of the Invention

The present invention relates to a method for connecting a one-to-one or one-to-many push-to-talk-over-cellular (PoC) session for an Open Mobile Alliance (OMA) PoC call service using a PoC Box as a storage system substituted for a general PoC client, and transmitting and managing PoC media after participating in the session.

2. Description of the Related Art

Current PoC technology generally utilizes Session Initiation Protocol (SIP) or Extended SIP, an application-layer protocol, for controlling Internet multimedia communication (IP telephony) in order to transmit session participation information of PoC group talks, and an Extensible Markup Language (XML) Configuration Access protocol (XCAP) in order to obtain information on a group. The basic definition, structure, and function of a conventional PoC system will be described below on the basis of these protocols.

Significant developments in mobile communications technology and the extension of mobile communications networks have resulted in the development of a vast array of services and applications for use with a cellular phone. Concurrently, there is an increasing demand from cellular phone users for additional services, such as a location, multimedia, and push-to-talk (PTT) services. Among these additional services, the PTT service supports various supplementary functions such as instant messenger and a status display, as well as a group call and a voice call, which are also provided by an existing radio or a trunk radio system (TRS).

Standardization of a PoC service that utilizes the push-to-talk (PTT) function in a mobile communication network is currently taking place. One unique feature of the PoC service that differs from an existing mobile communication service is that a user can participate in a plurality of PoC sessions, and thus, can use a call service while moving among the PoC sessions as desired. This feature is a requirement that is specified in the OMA, which is a forum for specifying mobile communications services.

The PoC service can accompany a service for establishing a group session as in a conference call. Accordingly, the OMA specification defines an XML Document Management (XDM) Client (XDMC) and XDM Server (XDMS) for providing a group list service FIG. 1 is a schematic diagram illustrating XDM architecture. Referring to FIG. 1, user equipment (UE) 10 that requests a PoC service is connected to a Session Initiation Protocol/Internet Protocol (SIP/IP) core 30 that supports SIP and IP multimedia via an access network 20. The UE 10 is an XDMC capable of residing in a PoC terminal, and includes an XDMC 12 and a PoC client 11 requesting the PoC service.

The PoC client 11 resides in a PoC user terminal to provide access to the PoC service. The PoC client 11 mainly serves to establish, participate in, and terminate the established PoC session. In addition, the PoC client 11 creates and transfers a media burst, supports an instant personal alert, and authenticates when providing access to the PoC service. Hereinafter, unless otherwise stated, the PoC client 11 is assumed to be the same as a PoC service subscriber.

The SIP/IP core 30 is connected to a shared XDMS 40, a PoC XDMS 50, a PoC server 60, and a presence server 70 in order to support the PoC service. The PoC server 60 has a Controlling PoC Function for maintaining and managing the PoC session, or a Participating PoC Function for participating in the PoC session for a one-to-one PoC call or a one-to-two or more PoC call.

The XDMS can be classified into the PoC XDMS 50, which is specific to the PoC service, and the shared XDMS 40, which is commonly used in a different service enabler. Further, the XDMS includes the Aggregation Proxy 90 that routes a group list relevant request to each XDM server according to a certain rule when receiving the group list relevant request from the XDMC 12. The protocols and details for the XDM, such as creating, modifying and deleting the group list, are well-known among those skilled in the art, and so their detailed description will be omitted herein.

In general, SIP or Extended SIP, i.e., an application-layer protocol for controlling Internet multimedia communication (IP telephony), are mainly used to transmit session participation information of PoC group talks. SIP is a standard defined in the Internet Engineering Task Force (IETF) Request for Comments (RFC) 2543. SIP is an application-layer control protocol that is used to set up, modify, and terminate a session or call for multimedia communication such as video and voice communication. SIP exists over a User Datagram Protocol (UDP)/TCP/IP layer, which supports both unicast and multicast sessions for initiating a session by inviting participants to a multimedia conference with a client/server protocol capable of exchanging SIP Request and Response messages in a request/response fashion.

The SIP Request message provides six functions in RFC 2543: INVITE (Invitation to participate in a session); ACK (Acceptance of an INVITE request); BYE (Termination of a call); REGISTER (Registration with the database of a redirect server by a user agent); CANCEL (Cancellation of a request in a queue); and OPTIONS. The SIP Response message provides status codes including: 1xx (Information response); 2xx (Successful response); 3xx (Redirection response); 4xx (Client Error, Request Failure); 5xx (Server Error); and 6xx (Global Failure).

FIG. 2 illustrates a schematic configuration of a conventional PoC server. The PoC server performs both a Controlling PoC Function (hereinafter CF) to control overall maintenance and management of a PoC session, and a Participating PoC Function (hereinafter PF) for controlling maintenance and management between each PoC session, which will be explained below with reference to Tables 1 and 2.

TABLE 1

Controlling PoC Function (CF)

Provides centralized PoC session handling
Provides centralized Media distribution
Provides centralized Talk Burst Arbitration functionality including talker identification TABLE 1-continued Controlling PoC Function (CF)

Provides SIP session handling, such as SIP session origination, termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation As shown in Table 1, the PoC server performing the CF (or the Controlling PoC server) manages a PoC session. In particular, the Controlling PoC server receives requests for the floor from PoC clients, arranges an order in which to give the clients the floor, and gives the clients the floor in that order. The Controlling PoC server also distributes a talk burst, for which an arbitrary PoC client makes a request, to all other PoC clients participating in a group PoC call, and provides information of the PoC clients participating in the group PoC call.

As shown in Table 2 below, the PoC server performing the PF (or the Participating PoC server) manages a PoC session between the Controlling PoC server and each PoC client. In particular, the Participating PoC server relays the floor between the PoC client and the Controlling PoC server when the PoC client makes a request for the floor or when the Controlling PoC server gives the floor to the PoC client. In addition, the Participating PoC server relays media between the Controlling PoC server and the PoC client, performs transcoding between different codecs, and filters one of two concurrent PoC sessions according to the choice of a PoC user when there is simultaneous talking in the two active PoC sessions.

TABLE 2

Participating PoC Function (PF)

Provides PoC session handling
May provide the Media relay function between PoC client and Controlling PoC server
May provide user media adaptation procedures
May provide the Talk Burst control message relay function between PoC client and Controlling PoC server
Provides SIP session handling, such as SIP session origination, termination, etc, on behalf of the represented PoC client
Provides policy enforcement for incoming PoC session (e.g. access control, incoming PoC session barring, availability status, etc.)
May collect and provide media quality information
Provides participant charging reports
May provide filtering of media streams in the case of simultaneous sessions
May provide transcoding between different codecs
May support Talk Burst Control Protocol Negotiation
Stores the current Answer Mode and Incoming PoC Session Barring preferences of the PoC client In the PoC service system described above, the PoC user can input information on groups and their members into a Group and List Management Server (GLMS) through the PoC user's terminal, and can receive information about other PoC users with whom the PoC user can talk through an individual or group list transmitted from the GLMS. Alternatively, in order to create, modify, and manage groups and their members, the information on the groups and their members may be input into the GLMS via a communication network, such as the Internet or an Intranet.

In order to use the PoC call service, the PoC user registers its PoC address with the SIP/IP core 30. The SIP/IP core 30 stores information on the PoC user by request of the PoC user. Accordingly, when another PoC user tries to request the group PoC call, the PoC user registers its information with the SIP/IP core 30 in advance as described above, and requests the group PoC call to its SIP/IP core 30 by using group identification information transmitted from the GLMS.

The SIP/IP core 30 performs addressing and domain locating by using information of the requesting PoC user, and then transfers a PoC call request to a home PoC server 60 with which the requesting PoC user is registered. In regard to the PoC call request, the PoC server 60 prepares to establish a PoC session, obtains each user's information from the GLMS, and then transfers a PoC call request signal to the SIP/IP core 30. When the PoC call request is made to users within an Intradomain, the PoC server 60 performs both the CF and the PF. The PoC server 60 managing the call-requested PoC user requests the PoC call to the PoC user after locating the SIP/IP core 30 by use of the PoC user's information transmitted to the PoC server 60.

FIG. 3 is a schematic diagram illustrating CF and PF blocks of a PoC server. Referring to FIG. 3, PoC clients 111, 121, 131, and 141 provide access to a CF 100 through PFs 110, 120, 130, and 140 respectively, thereby establishing a PoC session. When the floor is granted to a requester qualified as a talker from the CF 100, speech media of the corresponding PoC client is transmitted to each PoC client. The PoC user who is granted the floor cannot appropriately speak until the user confirms information of the participants participating in the PoC group session.

The PoC system required by the OMA has the following features.

First, the terminating side can set up its own answering modes according to the request of a PoC user. The answering modes can be either auto or manual.

If the terminating side is registered in a user list for the auto answer mode, the terminating side can immediately send an answer to the originating side in a corresponding network in place of the manual answer of a recipient. The automatic answer is sent instead of operating the terminal in the network because the PoC server stores the answering mode and the corresponding user list according to a request of the terminal to set the answering mode.

The manual answer mode corresponds to when the user is not included in an automatic answer user list or where the answer is ambiguous, or the recipient sets all users to make the manual answer. In the manual mode, a PoC call request is transmitted to the user's terminal through a terminating network and then a call is connected by acceptance of the PoC user.

Second, the PoC system is divided into two modes, an on-demand session mode and a pre-established (or early) session mode, according to the type of connection with a PoC server within a user's home network. The pre-established session mode is designed so that the PoC user sets a session between a PoC client and a PoC server belonging to a PoC user's home network in advance by the PoC user's request. The pre-established session enables the PoC user to negotiate media parameters to be used with the PoC server in advance, and thus advance rapid session establishment without renegotiating the media parameters to be used in the future between the PoC server and client.

In order to set the pre-established session, the PoC client provides supported media parameters to a Session Description Protocol Multipurpose Internet Mail Extensions (SDP MIME) body through a SIP INVITE method, and responds to the media parameters provided from the PoC server. The PoC client sends, to the PoC user, identification information of the pre-established session for a response message received from the PoC server, together with a conference Uniform Resource Identifier (URI). When using the pre-established session, it is possible to pre-negotiate such parameters as an IP address, a port number, a codec to be used and a Talk Burst Control Protocol (TBCP) for controlling a talk burst.

The on-demand session mode refers to a state in which the PoC user does not set the pre-established session, and indicates that the PoC user performs a PoC call connecting procedure after receiving an invitation message of another PoC user.

Hereinafter, a process of establishing a PoC session of the PoC system will be described with distinction between the originating side and the terminating side.

First, an originating PoC client A sends an SIP INVITE request message, which includes the SIP address of a recipient to whom the PoC client A desires to talk, to a corresponding SIP/IP core A. The INVITE request message includes information such as a PoC address of the call-requesting client, requested media parameters (because the requested session is based on the multimedia, having various media attribute values such as an audio and video encoding method, a rate and a payload type), and an attribute value informing PoC service and so on, and is forwarded to a PF via corresponding IP Multimedia Subsystem (IMS) servers (Proxy Call Session Control Function (P-CSCF) and Serving Call Session Control Function (S-CSCF)) in an IMS network through a route query at a Dynamic Host Configuration Protocol (DHCP) server or Domain Name System (DNS) server. Because the PF, to which a PoC user is connected at a general call request, can be implemented as an entity different from a CF that manages the talk burst of an established session, the INVITE request message forwarded previously is transmitted to the CF via an SIP/IP core of the corresponding network.

A PoC session controlling network including the CF transmits the INVITE request message to the terminating network, and then receives a response message. The SIP response message with which the terminating network responds may be one of a provisional response message of 1XX, a successful response message of 2XX, and an error response message of 4XX, 5XX or 6XX. If an AUTO-ANSWER mode is set, the CF can receive a SIP 183 Session Progress signal and thus perform connection between the PoC server and the PoC client in the IMS network of the call requester. The call acceptance signal of the recipient responds with the SIP 183 Session Process or SIP 200 OK response and is forwarded to the PoC client A via the CF and PF, the PoC servers.

After receiving the 200 OK or 183 Session Progress response from the terminating PoC server, the CF determines that a PoC call is connected and then sends a Floor Granted signal, which gives the talk burst floor to the PoC client A. Granting of the talk burst authority according to the response (200 OK or 183 Session Progress) can be divided into confirmed and unconfirmed. When receiving the unconfirmed response, the CF requires a buffering function.

After receiving the response signal to the INVITE request signal, the originating PoC client A receives the Floor Granted signal forwarding a talk burst transmission enable signal (i.e. a ring back tone) using a Real-time Transport Protocol (RTP) Control Protocol (RTCP). At this time, the Floor Granted signal is generated from the CF having the authority to arbitrate the talk burst, and transmitted to the corresponding PoC client via the PF, which manages the corresponding PoC client. The Floor Granted signal can be transmitted without passing through the SIP/IP core because it uses a bearer's route rather than the SIP. Finally, the PoC user that confirms the ring back tone transmits a media stream (e.g., voice) using an RTP.

The OMA PoC Release 2 takes into account a PoC Box, which has a function somewhat similar to a conventional multimedia message (MM) Box in order to further extend the PoC service. According to a PoC Box service, on behalf of a client of the PoC user who cannot participate in the one-to-one or group PoC session in real time, a specific physical or logical system (e.g., a PoC Box) participates in a corresponding PoC session, stores media transmitted during the session, and then transmits/reproduces the stored media at the request of the PoC user.

Accordingly, in order to implement the PoC Box service, which is not provided in conventional PoC standard technology, a PoC client is required to prepare for performing methods for requesting the PoC Box service, setting a type of media to be provided with the PoC Box service, and determining whether the PoC Box service is used or not.

SUMMARY OF THE INVENTION

It is an object of the present invention to provide a method for setting a PoC Box service and transmitting information on a service identifier by using a standard SIP, a Session Description Protocol (SDP), an XCAP, and a Push Access Protocol (PAP), in order to remain compatible with conventional PoC technology, when performing call processing of a session connection using a PoC Box.

It is another object of the present invention to provide a method for storing only pre-designated media in a PoC Box according to a type of media transmitted in consideration of features of a PoC multimedia session.

According to the present invention, there is provided a method for performing a media storage service in a push-to-talk-over-cellular (PoC) network, including requesting, by a client that does not participate in a session, the media storage service, and when media is transmitted by an arbitrary client in a state in which the media storage service is requested, transmitting the media to a media storage part.

Additionally, according to the present invention, there is provided a push-to-talk-over-cellular (PoC) system for performing a media storage service in a PoC network, including a terminating PoC system. The PoC system includes a terminating PoC client that requests the media storage service when not participating in a sessions a terminating PoC server from which the media storage service of the terminating PoC client is requested, and a media storage part that stores media according to media storage service setting of the terminating PoC client; and a PoC server that transmits media generated from an arbitrary originating PoC system to the media storage part of the terminating PoC system requesting the media storage service, and manages the session.

Further, according to the present invention, a method is provided for a push-to-talk-over-cellular (PoC) client provided with a media storage service in a PoC network. The method includes requesting the media storage service from a PoC server managing a session when not participating in the session, and when media is transmitted by an arbitrary client in a state in which the media storage service is requested, transmitting the media to a media storage part of a PoC system to which the PoC client that does not participate in the session belongs.

BRIEF DESCRIPTION OF THE DRAWINGS

The above and other objects, features, and advantages of the present invention will be more clearly understood from the following detailed description, taken in conjunction with the accompanying drawings, in which:

FIG. 5 illustrates a message format based on a PUBLISH method for setting a PoC Box service of FIG. 4;

FIGS. 6A and 6B illustrate an additional configuration of an XML Schema for using a PUBLISH method of FIG. 5;

FIG. 7 illustrates a message format of a 200 OK response for notifying session connection using a PoC Box in FIG. 4.

DETAILED DESCRIPTION OF THE PREFERRED EMBODIMENTS

Hereinafter, preferred embodiments of the present invention will be described in full detail with reference to the accompanying drawings. In the following description, a detailed description of well-known functions and configurations has been omitted for clarity and conciseness.

Figure 1:
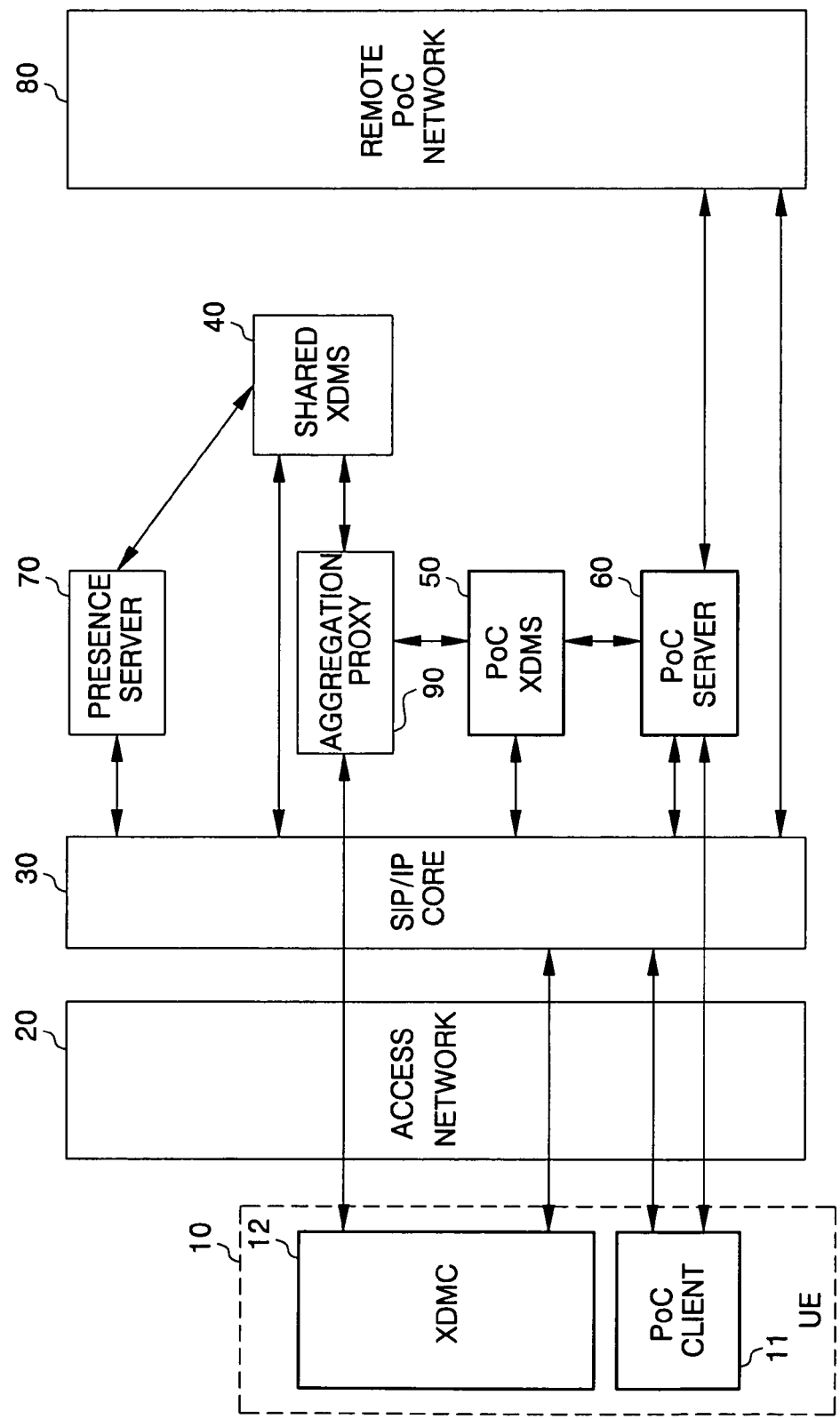
FIG. 1 is a schematic diagram illustrating conventional XDM architecture.
Figure 2:
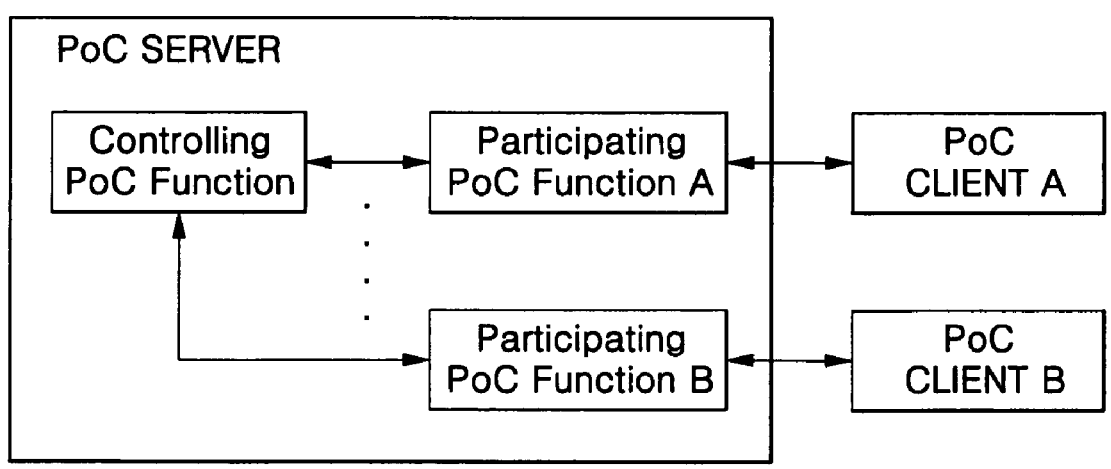
FIG. 2 shows a schematic configuration illustrating a conventional PoC server.
Figure 3:
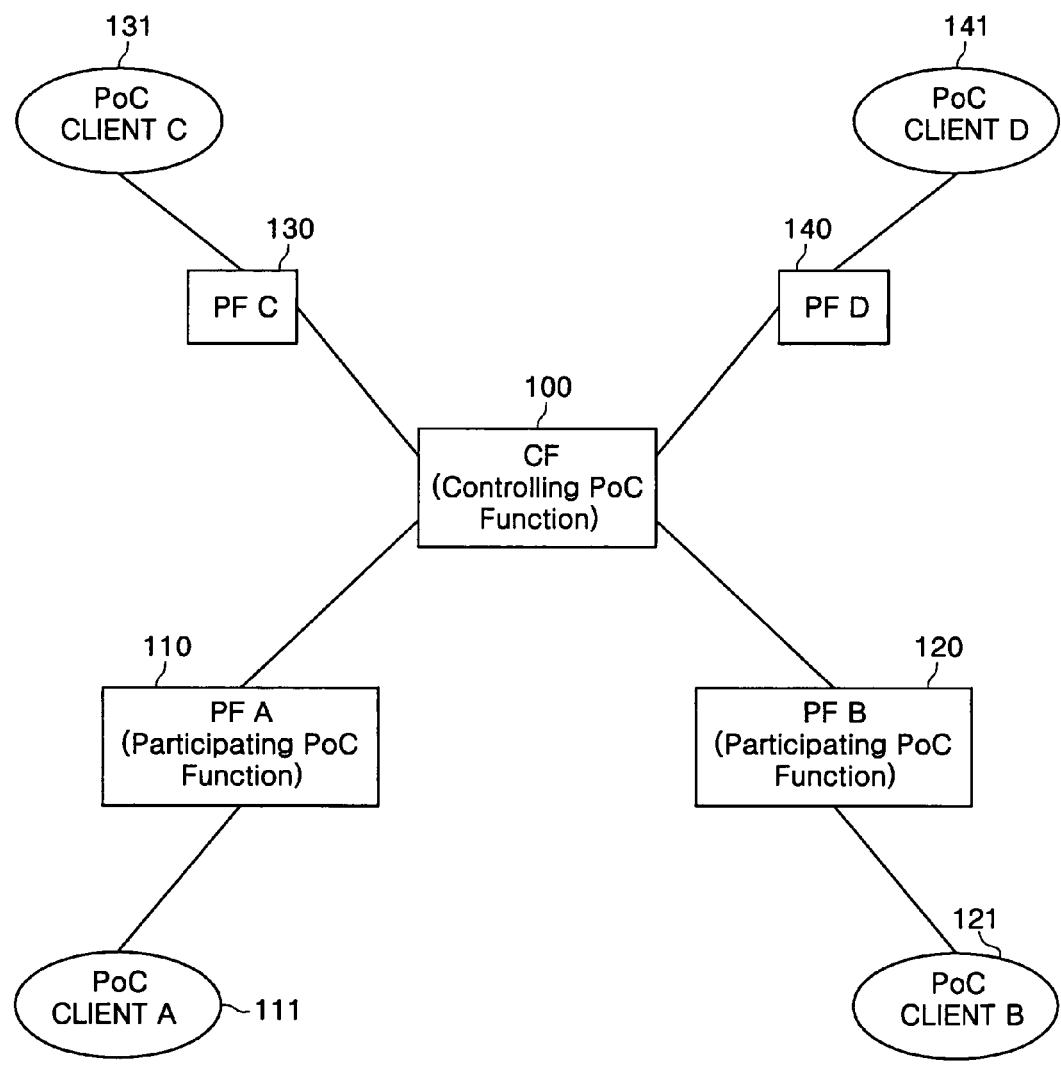
FIG. 3 is a schematic diagram illustrating CF and PF blocks of a PoC server.
Figure 4:
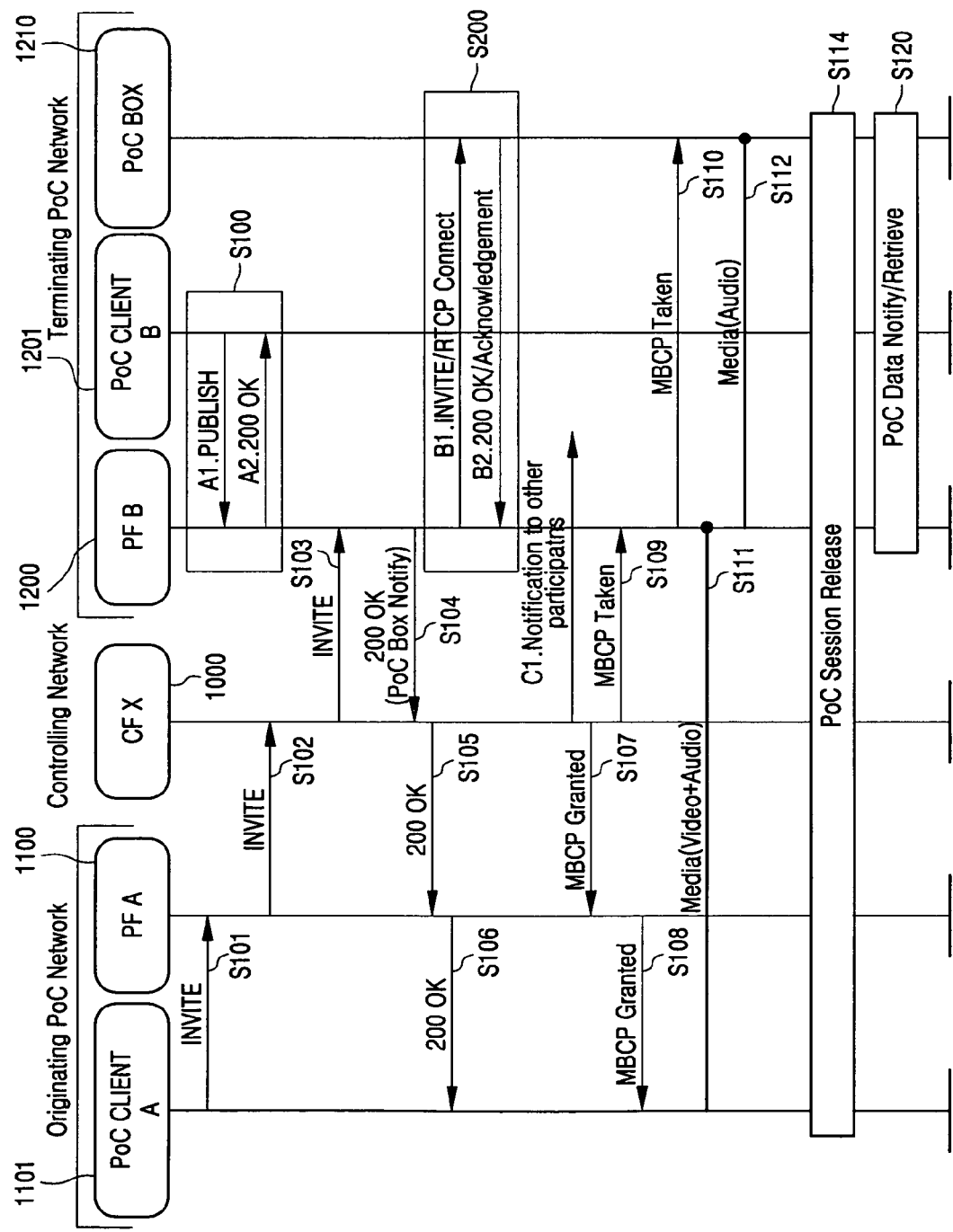
FIG. 4 illustrates flow of signals for a process for setting a PoC Box service as well as a process for establishing a PoC session using the same in accordance with the present invention.

FIG. 4 illustrates flow of signals for a process for setting a PoC Box service as well as a process for establishing a PoC session using the same in accordance with the present invention. In a preferred embodiment of FIG. 4, an originating PoC system includes an originating PoC server and an originating PoC client. A terminating PoC system includes a terminating PoC server and a terminating PoC client.

In FIG. 4, the terminating PoC client B 1201 requests PoC service setting from its own PF B 1200 (that is, a PoC server performing a Participating PoC Function) in order to be provided with a PoC Box service when not participating in a PoC session. The PoC service setting uses a PUBLISH method, which is a standard SIP method (S100 A1 and A2).

The terminating PoC client B may not only request the PoC Box service, but also reflect the request of a PoC user by designating an answering mode to the PF and a type of media to be stored in a PoC Box 1210. Details of the PUBLISH message sent in step S100 A1 will be described below with reference to FIG. 5.

After the PoC Box service is set in step S100, when receiving a session INVITE message from an arbitrary PoC client A 1101 (S101, S102, and S103), the PF B 1200 transmits 200 OK to a CF X 1000 (a PoC server performing a Controlling PoC Function) according to the set answering mode. An entity connected to the PoC session includes an identifier in order to notify that an answering subject is the PoC Box 1210 instead of the PoC client B 1201(S104). Information on the identifier can be transmitted to the CF X 1000 first, and then to other PoC clients belonging to a conference in various message forms. A method of transmitting the identifier information of the PoC Box service to each PoC client may vary depending on a type of the session or participation in the session, and may use a SIP response signal or Real-time Transport Protocol (RTP) Control Protocol (RTCP) message (S105 and S106, C1). A detailed SDP MIME message format of the SIP message for transmitting the identifier information of the PoC Box service will be described below with reference to FIG. 7.

After receiving the 200 OK response from the PF B 1200, the CF X 1000 transmits a Media Burst Control Protocol (MBCP) Granted and Taken messages using a MBCP for managing a media burst (S107, S108, S109, and S110), and thus a multimedia stream is transmitted (S111 and S112). At this time, only specific media can be transmitted to the PoC Box 1210 according the setting of the PoC client. If the media type set by the PoC client is audio, the audio is stored in the PoC Box 1210. If both audio and video are set, both are stored in the PoC Box 1210.

When the PoC session is ended (S114), the stored PoC media data can be transmitted to a corresponding PoC user through a notification/retrieval procedure between the PoC Box and the PoC client (S120).

After confirming the PoC Box service, the CF X 1000 may not transmit the MBCP to the corresponding PoC user (i.e. the PoC Box), because it is determined through the identifier information of the PoC Box 1210 that the PoC Box 1210 does not transmit a Media Burst Request message. In this case, steps S109 and S110 can be omitted until the session is ended.

FIG. 5 illustrates a message format based on a PUBLISH method for setting a PoC Box service of FIG. 4.

When the PoC Box service is requested, a PUBLISH message performs answering mode setting of a PF and service setting of a PoC Box. These setting values are expressed in the body of the message by an XML, and additional parts in an XML Schema for using this will be described with reference to FIG. 6.

A PUBLISH XML part expresses parameters associated with the PoC Box service using an XML element name of "pocbox-settings." In the "pocbox-settings" element, whether to use the service can be expressed in a binary digit. If a value of "poc-box active" is "true," use of the PoC Box can be indicated.

As an extended application of the present invention, a type of media transmitted from the PF to the PoC server can be indicated by "media-xxxx" in the service. According to a designated media type, the PF can transmit only a corresponding media to the PoC Box. Accordingly, the PoC Box service can be effectively managed.

Further, the present invention can request the PoC Box service with distinction of a session/group type (one-to-one, pre-arranged, chat, or ad-hoc) or a specific user when setting the PoC Box service. This is possible by additionally defining MIME contents included the PUBLISH message. For example, only the media of a specific group can be stored by designating a "group-type" in the "pocbox-settings" element. The PoC Box service can be operated only at a session request from a specific user by designating an address or identifier (such as SIP URI or TEL URI) of the PoC user. This method does not depart from the scope of the present invention, and so its detailed description will be omitted.

FIGS. 6A and 6B illustrate an additional configuration of an XML Schema for using a PUBLISH method of FIG. 5. An addition XML Schema of a "poc-settings" element and detailed parameters included in PUBLISH message contents is defined. A service request is expressed by defining a parameter of each element name as "boolean."

FIG. 7 illustrates a message format of a 200 OK response for notifying session connection using a PoC Box in FIG. 4, wherein when a PF sends a response to a CF, a conference server, a header and body part of the 200 OK response for notifying that a PoC Box service is used. The header part of the OK response is the parameter part of a general SIP signal, and so its description will be omitted. In the present invention, the PoC Box service is notified through the SIP response signal, but it can use SDP MIME contents as in FIG. 7 for the purposes of compatibility with conventional SIP standard technology. In the MIME contents, a parameter of "poc_box" is defined in an "a=" string designating the format parameter of a Talk Burst Control Protocol (TBCP), and its binary value is allowed to notify whether the PoC Box service is used (the PoC Box service is used when poc_box=1, while the PoC Box service is not used when poc_box=0).

Figure 8:
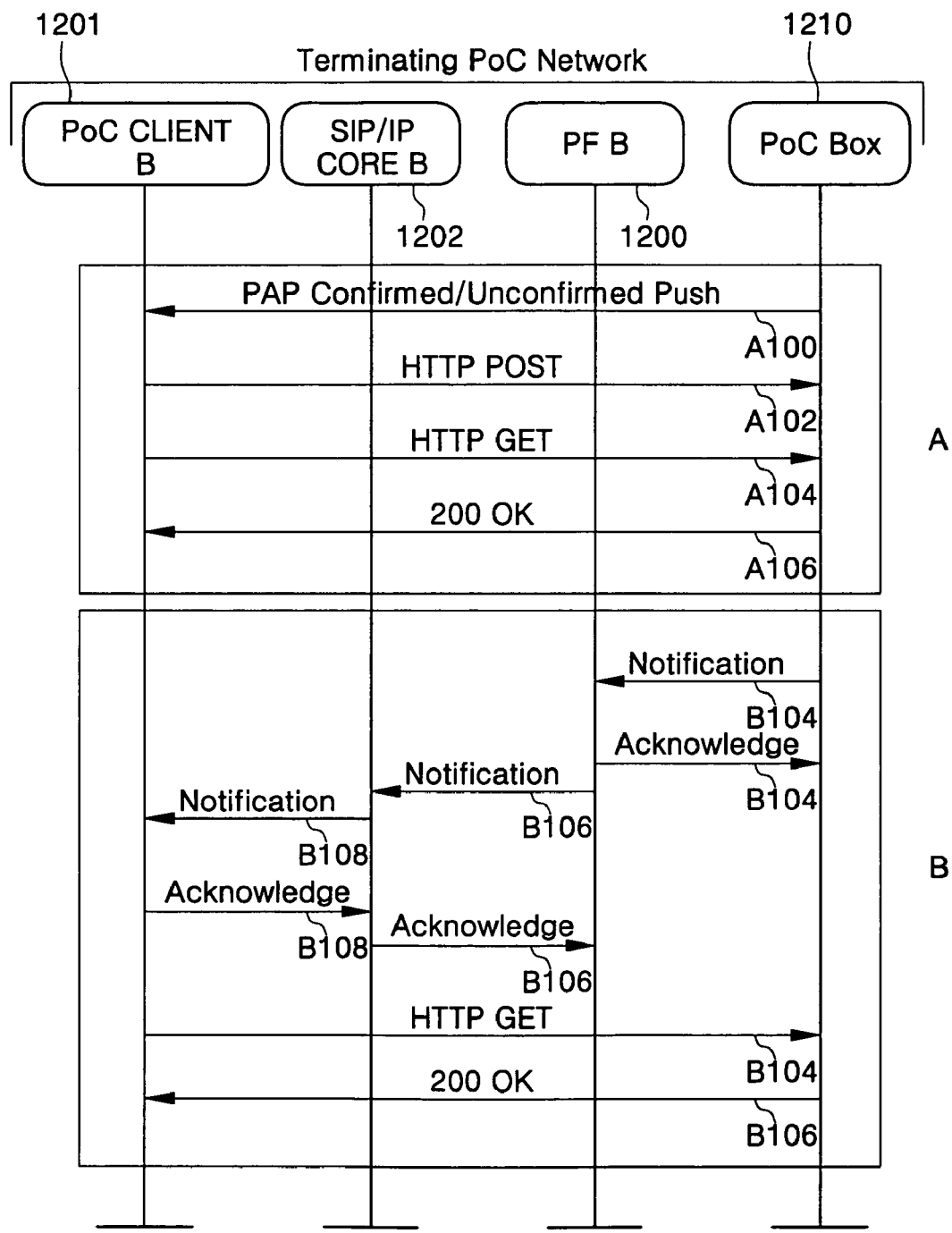
FIG. 8 illustrates a detailed flow of signals for transmitting a message stored in a PoC Box in FIG. 4.

FIG. 8 illustrates a detailed flow of signals for transmitting a message stored in a PoC Box in FIG. 4. Referring to FIG. 8, when completing storage of a media depending on release of a session, a PoC Box notifies a PoC client through a Push technique (PAP PUSH/HTTP POST) (A100 and A102), and then the PoC client requests a HTTP GET (A104) as shown in a block A. As a result, a scheme of receiving a message is possible.

Alternatively, as illustrated in block B, the PoC Box notifies the PoC client through an SIP Notification technique, and then the PoC client requests an HTTP GET. Accordingly, the scheme of receiving the message is enabled.

With regard to the steps of each method required for the present invention such as the PoC Box service request, it should be appreciated by those skilled in the art that a variety of modifications and changes can be made without departing from the spirit and scope of the present invention.

According to the present invention as described above, when the PoC user cannot participate in the PoC session due to various restrictions such as connection failure, absence, or restriction of time, the PoC user participates in the PoC session using the PoC Box or its alternative, a Proxy storage, and then the transmitted media is stored.

As a result, when a PoC client is unable to participate in a session, it can later receive details of the missed session through the PoC Box.

Further, the present invention can rapidly set up the session appropriate for a PTT environment by optimizing use of the features of the PoC Box, and thus reducing traffic on the network.

While the present invention has been described with reference to preferred embodiments thereof, it will be understood by those skilled in the art that various changes in from and detail may be made therein without departing from the scope of the present invention as defined by the following claims.

What is claimed is:

1. A push-to-talk-over-cellular (PoC) server for providing a media storage service in a PoC network, the PoC server comprising:
   a storage for storing a service setting which is changed and set by a PoC client;
   a receiver for receiving an invite message and PoC media data from an arbitrary PoC client;
   a checking device for checking whether a PoC BOX use setting is set by the PoC client when the invite message is received;
   a router for routing the invite message from the arbitrary PoC client to the PoC BOX according to the service setting stored in the storage; and
   a transmitter for transmitting the received PoC media data to the PoC BOX,
   wherein the service setting is the PoC BOX use setting.

2. The PoC server according to claim 1, further comprising, an indicator for indicating the PoC BOX use setting by the service setting to the arbitrary PoC client.

3. The PoC server according to claim 1, wherein the service setting uses XML schema.

4. The PoC server according to claim 1, wherein the service setting is included in a Session Initiation Protocol (SIP) PUBLISH.

5. The PoC server according to claim 1, wherein the invite message includes information of the PoC client.

6. The PoC server according to claim 1, wherein the PoC client utilizes a cellular phone.

7. The PoC server according to claim 3, wherein the invite message of the arbitrary PoC client is included in a session to the PoC BOX only when the PoC BOX use setting is 'true'.

8. The PoC server according to claim 1, further comprising,
   a controller for controlling transmission of the media data to the PoC BOX.

9. A method for performing a media storage service in a push-to-talk-over-cellular (PoC) network by a PoC server, the method comprising the steps of:
   receiving a service setting from a PoC client;
   storing the service setting in the PoC server;
   receiving an invite message and PoC media data from an arbitrary PoC client;
   checking whether a PoC BOX use setting is set by the PoC client when the invite message is received;
   routing the invite message from the arbitrary PoC client to the PoC BOX according to the service setting stored in the storage;
   receiving media data from the arbitrary PoC client and storing the media data in the PoC BOX according to the service setting; and
   transmitting the media data stored in the PoC BOX to the PoC client when the PoC client participates in a session;
   wherein the service setting is the PoC BOX use setting.

10. The method according to claim 9, wherein the service setting uses XML schema.

11. The method according to claim 10, wherein the PoC BOX use setting is information regarding use of a PoC BOX, uses of media data types and uses of media data types to be stored in the PoC BOX.

12. The method according to claim 9, wherein the service setting is included in a Session Initiation Protocol (SIP) PUBLISH.

13. The method according to claim 9, further comprising:
   indicating the PoC BOX use setting by the service setting to the arbitrary PoC client.

14. The method according to claim 9, wherein:
   a routing invitation of the arbitrary PoC client is included in a session to the PoC BOX when the PoC BOX use setting is 'true'.

15. The method according to claim 9, wherein the invite message includes information of the PoC client.

16. A push-to-talk-over-cellular (PoC) client provided with a media storage service in a PoC network, the PoC client comprising:
   a transmitter for transmitting a service setting to a PoC server and transmitting media data to the PoC server;
   a receiver for receiving media data stored in a media storage when participating in a session; and
   a player for playing the received media data from the media storage;
   wherein the service setting is a media storage use setting.

17. The PoC client according to claim 16, wherein the service setting uses XML schema.

18. The PoC client according to claim 16, wherein the service setting is included in a Session Initiation Protocol (SIP) PUBLISH.

19. The PoC client according to claim 16, wherein the PoC client utilizes a cellular phone.

20. The PoC client according to claim 16, wherein the media storage utilizes a PoC BOX.

21. The PoC client according to claim 16, wherein the media storage utilizes a proxy storage for storing the media data.

22. The PoC client according to claim 16, wherein the transmitter transmits the service setting when the PoC client cannot participate in a PoC session.

23. The PoC client according to claim 16, wherein the transmitter sends an invite message including information of a particular client to the PoC server.

24. The PoC client according to claim 16, wherein the receiver receives an indicator on whether the media storage use setting is set by a particular client in the PoC server in response to the invite message.

25. A method for performing a media storage service in a push-to-talk-over-cellular (PoC) network by a PoC client, the method comprising the steps of:
  transmitting a service setting to a PoC server;
  requesting media data service to the PoC server;
  receiving media data stored in media storage after participating in a session; and
  playing the media data;
  wherein the service setting is a media storage use setting.

26. The method according to claim 25, wherein the service setting uses XML schema.

27. The method according to claim 25, wherein the service setting is included in a Session Initiation Protocol (SIP) PUBLISH.

28. The method according to claim 25, wherein the media storage utilizes a PoC BOX.

29. The method according to claim 25, wherein the media storage utilizes a proxy storage for storing the media data.

30. The method according to claim 25, further comprising transmitting the service setting to the PoC server when the PoC client cannot participate in a PoC session.

31. The method according to claim 25, further comprising:
  sending an invite message including information of a particular client to the PoC server.

32. The method according to claim 25, further comprising:
  receiving an indicator on whether the media storage use setting is set by a particular client in the PoC server in response to the invite message.

* * * * *